(12) United States Patent
Hirakata et al.

(10) Patent No.: US 7,834,942 B2
(45) Date of Patent: Nov. 16, 2010

(54) IMAGE WRITING/DISPLAY DEVICE AND IMAGE WRITING/DISPLAY METHOD

(75) Inventors: Masaki Hirakata, Kanagawa (JP); Takashi Morikawa, Kanagawa (JP); Takeshi Matsunaga, Kanagawa (JP); Atsushi Hirano, Kanagawa (JP); Hiroshi Arisawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 280 days.

(21) Appl. No.: 12/194,164

(22) Filed: Aug. 19, 2008

(65) Prior Publication Data

US 2009/0167967 A1 Jul. 2, 2009

(30) Foreign Application Priority Data

Dec. 26, 2007 (JP) ............................. 2007-333647

(51) Int. Cl.
*G02F 1/1333* (2006.01)
(52) U.S. Cl. ............................. 349/12; 349/1; 349/187
(58) Field of Classification Search ...................... 349/1, 349/2, 12, 16, 175, 187, 193
See application file for complete search history.

(56) References Cited

U.S. PATENT DOCUMENTS

| | | | |
|---|---|---|---|
| 5,889,566 A * | 3/1999 | Wu et al. | 349/35 |
| 6,744,418 B2 * | 6/2004 | Hiji et al. | 345/94 |
| 6,774,880 B2 * | 8/2004 | Kobayashi | 345/84 |
| 2003/0043317 A1 | 3/2003 | Cirkel et al. | |
| 2004/0105614 A1 * | 6/2004 | Kobayashi et al. | 385/16 |
| 2007/0268416 A1 * | 11/2007 | Harada et al. | 349/2 |
| 2009/0167967 A1 * | 7/2009 | Hirakata et al. | 349/12 |
| 2009/0184944 A1 * | 7/2009 | Ishii et al. | 345/204 |

FOREIGN PATENT DOCUMENTS

| | | |
|---|---|---|
| JP | A-2002-006280 | 1/2002 |
| JP | A-2005-501294 | 1/2005 |
| JP | A-2005-196088 | 7/2005 |
| WO | WO 03/019277 | 3/2003 |

\* cited by examiner

*Primary Examiner*—Brian M Healy
(74) *Attorney, Agent, or Firm*—Oliff & Berridge PLC

(57) ABSTRACT

An image writing/display device has a voltage applying section, a pressure applying section, an initialization controlling section, and an image writing controlling section. In a state in which a display medium having a pair of electrodes and a display layer that is sandwiched between the pair of electrodes and whose reflectance is changed is positioned, the voltage applying section applies voltage to the pair of electrodes for changing the reflectance of the display layer. The pressure applying section applies pressure for changing the reflectance of the display layer. The initialization controlling section makes the display layer a uniform reflectance by applying pressure to the display layer with the pressure applying section. The image writing controlling section writes an image by applying data voltage from the voltage applying section to specific regions, that correspond to image data, of the display layer between the pair of electrodes.

7 Claims, 7 Drawing Sheets

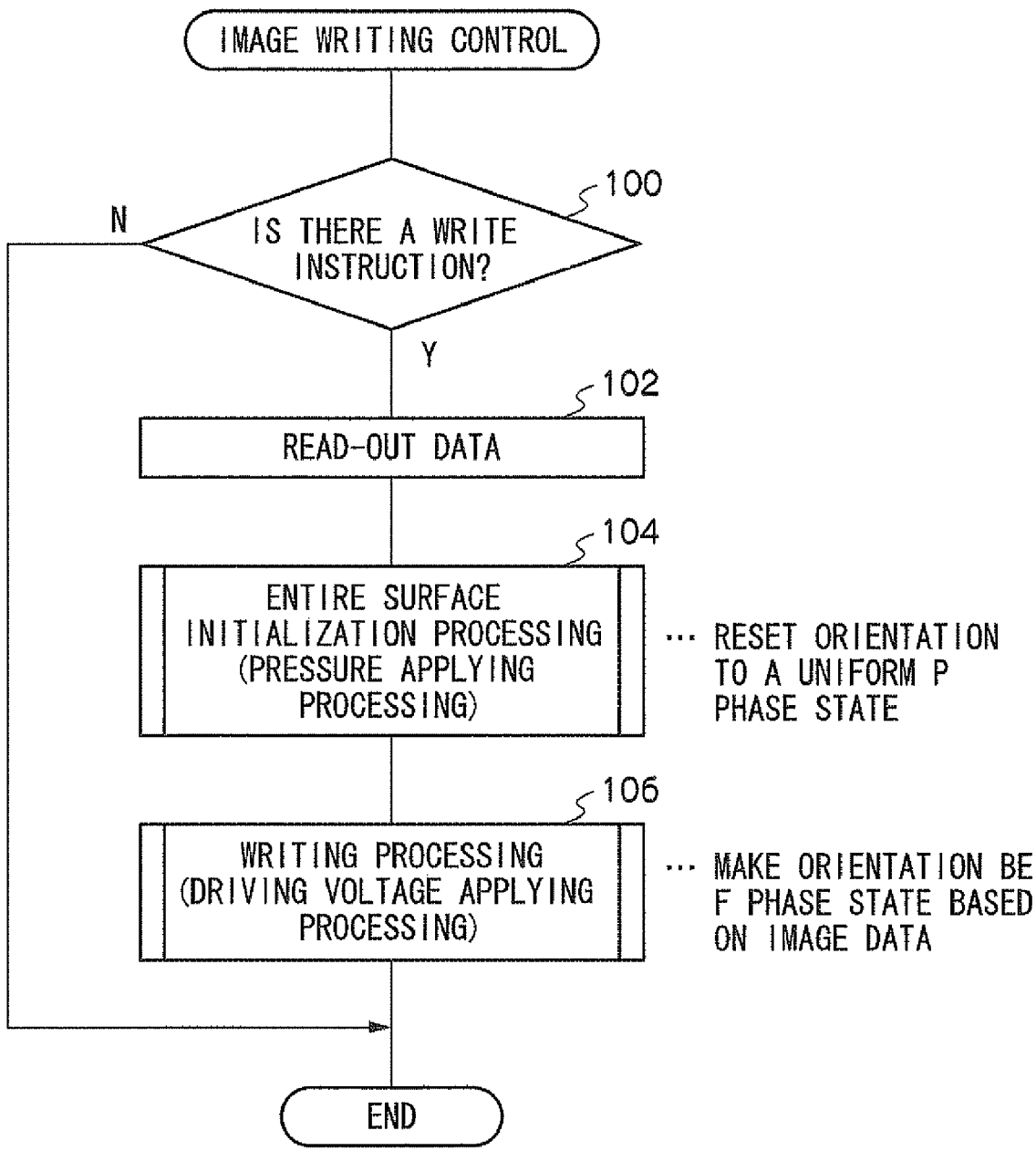

IMAGE WRITING/DISPLAY DEVICE AND IMAGE WRITING/DISPLAY METHOD

CROSS-REFERENCE TO RELATED APPLICATIONS

This application is based on and claims priority under 35 USC 119 from Japanese Patent Application No. 2007-333647 filed Dec. 26, 2007.

BACKGROUND

1. Technical Field

The present invention relates to an image writing/display device and an image writing/display method.

2. Related Art

There are proposed devices that display images as follows: a cholesteric liquid crystal layer is a display layer, and by applying driving voltage between a pair of electrodes, the orientation pattern of the cholesteric liquid crystal layer is changed to a focal conic phase (F phase), a planar phase (P phase), a homeotropic phase (H phase).

High reflectance and low driving voltage are always demanded of devices using a cholesteric liquid crystal layer. Note that, although there are various required reflectances and driving voltages depending on the environments, conditions and specifications that are applied, high reflectance generally means greater than or equal to 40%, and low driving voltage generally means less than or equal to 40 V.

Here, in a cholesteric liquid crystal layer, in a case in which all of the orientation changes are provided by applying driving voltage, the reflectance and the driving voltage are in a substantially linear relationship (proportional relationship) with the thickness of the cholesteric liquid crystal layer. Accordingly, when attempting to obtain a sufficient reflectance, the thickness of the cholesteric liquid crystal layer becomes thicker, and the driving voltage becomes higher.

Other than driving voltage, pressure and temperature are ways of controlling the orientation of the cholesteric liquid crystal layer.

SUMMARY

The present invention provides an image writing/display device and image writing/display method that can mitigate limitations on the thickness of a display layer.

According to an aspect of the present invention, there is provided an image writing/display device having: a voltage applying section that, in a state in which a display medium having a pair of electrodes and a display layer that is sandwiched between the pair of electrodes and whose reflectance is changed is positioned, applies voltage to the pair of electrodes for changing the reflectance of the display layer; a pressure applying section applying pressure for changing the reflectance of the display layer; an initialization controlling section for making the display layer a uniform reflectance by applying pressure to the display layer with the pressure applying section; and an image writing controlling section writing an image by applying data voltage from the voltage applying section to specific regions, that correspond to image data, of the display layer between the pair of electrodes.

BRIEF DESCRIPTION OF THE DRAWINGS

Exemplary embodiments of the present invention will be described in detail based on the following figures, wherein:

FIG. 7 is a flowchart showing an image writing control routine relating to the present exemplary embodiment.

DETAILED DESCRIPTION

Properties of Display Medium

Figure 1:
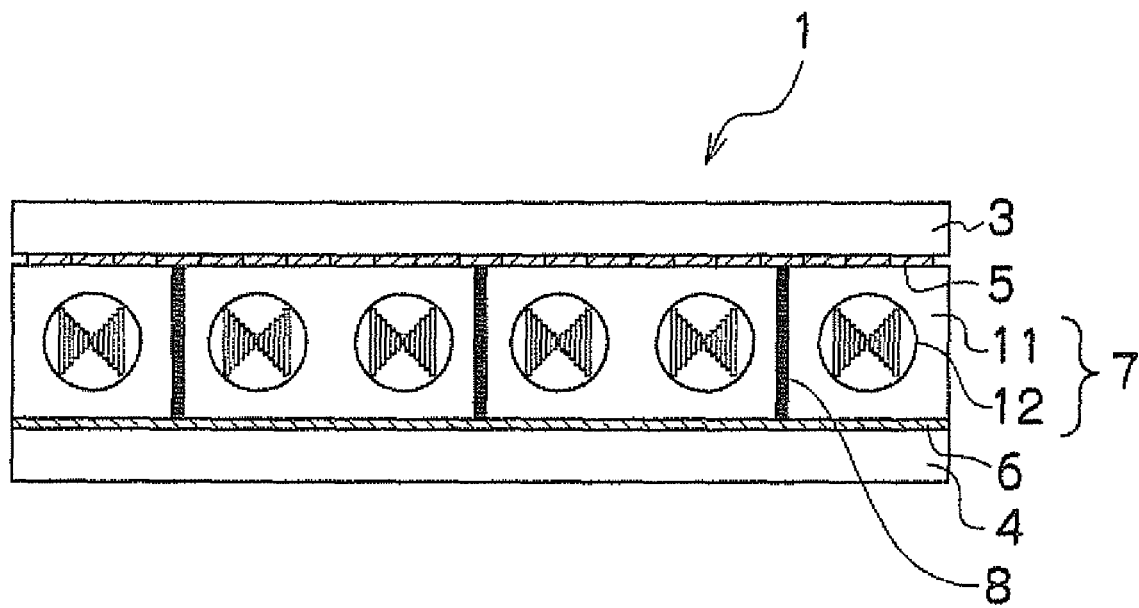
FIG. 1 is a sectional view of a display medium relating to the present exemplary embodiment.

FIG. 1 is a sectional view of an optical writing type display medium 1 in the present exemplary embodiment. The display medium 1 is in an F reset state, and is a display medium at which an image can be recorded by application of a bias signal (voltage) corresponding to an image.

As shown in FIG. 1, the display medium 1 is structured such that a transparent substrate 3, a transparent electrode 5, a display layer (liquid crystal layer) 7, an electrode 6 and a substrate 4 are layered in that order from the display surface side.

The transparent substrate 3 and the substrate 4 hold respective functional layers at the inner surfaces thereof, and are for maintaining the structure of the display medium. The transparent substrate 3 and the substrate 4 are structured by sheet-like members having strength that can withstand external forces. At least incident light is transmitted through the transparent substrate 3 at the display surface side, and this surface is the side at which the image displayed at the display layer 7 is viewed.

The transparent substrate 3 and the substrate 4 are preferably flexible. Specific examples of materials therefor are inorganic sheets (e.g., glass, silicon), polymer films (e.g., polyethylene terephthalate, polysulfone, polyethersulfone, polycarbonate, polyethylene naphthalate), and the like. Known functional films, such as an anti-fouling film, an abrasion-resistant film, an anti-reflection film, a gas barrier film, and the like may be formed at the outer surfaces of the transparent substrate 3 and the substrate 4.

Note that, in the present exemplary embodiment, the transparent substrate 3 is transmissive over the entire visible light range. However, the transparent substrate 3 may be transmissive only in the range of wavelengths that are displayed.

The transparent electrode 5 and the electrode 6 are for applying driving voltage to the respective functional layers within the display medium 1.

The transparent electrode 5 and the electrode 6 exhibit planar-uniform electrical conductivity, and at least incident light is transmitted through the transparent electrode 5 at the display surface side. Specific examples of materials therefor are electrically conductive thin films formed of metals (e.g., gold, aluminum), metal oxides (e.g., indium oxide, tin oxide, indium tin oxide (ITO)), electrically conductive organic polymers (e.g., polythiophene polymers, polyaniline polymers), and the like. Known functional films, such as an adhesive force improving film, an anti-reflection film, a gas barrier film, and the like may be formed at the surfaces of the transparent electrode 5 and the electrode 6.

Note that, in the present exemplary embodiment, the transparent electrode 5 is transmissive over the entire visible light range. However, in the same way as the transparent substrate 3, the transparent electrode 5 may be transmissive only in the range of wavelengths that are displayed.

The display layer 7 has the function of modulating the reflecting/transmitting state of a specific color light among the incident light in accordance with an electric field, and has the property that the selected state can be maintained under no electric field. The display layer 7 preferably is a structure that does not deform with respect to external forces such as flexure, pressure and the like In the present exemplary embodiment, as an example, the display layer 7 is structured by a liquid crystal layer that is a self-maintaining liquid crystal composite formed from cholesteric liquid crystals and a transparent resin. Namely, the display layer 7 is a liquid crystal layer that does not require spacers or the like in order to have self-maintainability as a composite. However, the display layer 7 is not limited to the same. In the present exemplary embodiment, as shown in FIG. 1, the display layer 7 is a state in which cholesteric liquid crystals 12 are dispersed in a polymer matrix (transparent resin) 11.

It is preferable that the display layer 7 be appropriately partitioned by ribs 8 so that the cholesteric liquid crystals 12 do not tend toward one side and are dispersed substantially uniformly.

(Cholesteric Liquid Crystal Composition)

The cholesteric liquid crystals 12 have the function of modulating the reflecting/transmitting state of a specific color light among the incident light. Namely, the liquid crystal molecules are twisted in helical shapes and oriented, and interfere with and reflect a specific light which is dependent upon the helical pitch, among the light that is incident from the direction of the helical axis. Further, the orientation of the liquid crystal molecules varies in accordance with an electric field, and the reflecting state can be varied. It is preferable that the drop size is uniform, and that the liquid crystal molecules are disposed densely in a single-layer.

Specific examples of liquid crystals that can be used as the cholesteric liquid crystals 12 are nematic liquid crystals and smectic liquid crystals (e.g., Schiff base, azo, azoxy, benzoate ester, biphenyl, terphenyl, cyclohexylcarboxylate ester, phenylcyclohexane, biphenylcyclohexane, pyrimidine, dioxane, cyclohexylcyclohexane ester, cyclohexylethane, cyclohexane, tolan, alkenyl, stilbene, and condensed polycyclic liquid crystals), or products obtained by adding a chiral agent (e.g., steroid cholesterol derivatives, and Schiff base, azo, ester and biphenyl agents) to mixtures of these liquid crystals, or the like.

The helical pitch of the cholesteric liquid crystals is adjusted by the added amount of the chiral agent with respect to the nematic liquid crystals. For example, in a case in which the display colors are blue, green and red, the center wavelengths of selective reflection are in the ranges of 400 nm to 500 nm, 500 nm to 600 nm, and 600 nm to 700 nm, respectively. Further, in order to compensate for the temperature dependency of the helical pitch of the cholesteric liquid crystals, the known method of adding plural chiral agents having different twisting directions or exhibiting opposite temperature dependencies may be employed.

A PNLC (Polymer Network Liquid Crystal) structure containing a mesh-like resin in a continuous phase of the cholesteric liquid crystals, and a PDLC (Polymer Dispersed Liquid Crystal) structure (including a microencapsulated structure) in which cholesteric liquid crystals are dispersed in droplet forms in a polymer skeleton, can be used as the form in which the display layer 7 forms a self-maintaining liquid crystal composite formed from the cholesteric liquid crystals 12 and the polymer matrix (transparent resin) 11. By using a PNLC structure or a PDLC structure, an anchoring effect is brought about at the interfaces between the cholesteric liquid crystals and the polymer, and the state of maintaining the planar phase or the focal conic phase under no electric field can be made to be more stable.

The PNLC structure and the PDLC structure can be formed by known methods of phase-separating the polymer and the liquid crystals, such as, for example: the PIPS (Polymerization Induced Phase Separation) method in which a polymer precursor that is polymerized by heat, light, an electron beam or the like, such as an acrylic type, a thiol type, an epoxy type or the like, and liquid crystals are mixed together, and the mixture is polymerized from a uniform phase state so as to cause phase separation; an emulsion method in which a polymer having low solubility of liquid crystals, such as polyvinyl alcohol or the like, and liquid crystals are mixed together, stirring and suspension are carried out, and the liquid crystals are dispersed in droplets in the polymer; the TIPS (Thermally Induced Phase Separation) method in which a thermoplastic polymer and liquid crystals are mixed together, and cooling is carried out from a state in which the mixture is heated to a uniform phase, so as to cause phase separation; the SIPS (Solvent Induced Phase Separation) method in which a polymer and liquid crystals are dissolved in a solvent such as chloroform or the like, and the solvent is evaporated so as to cause phase separation of the polymer and the liquid crystals; and the like. However, the method is not particularly limited.

(Polymer Matrix 11)

The polymer matrix 11 holds the cholesteric liquid crystals 12, and has the function of suppressing flowing of the liquid crystals (changes in the image) due to deformation of the display medium. A polymer material, that does not dissolve in a liquid crystal material and for which a liquid that is not compatible with liquid crystals is used as a solvent, is suitably used as the polymer matrix 11. Further, it is desirable that the polymer matrix 11 be a material that has the strength to withstand external forces and exhibits high transmissivity with respect to at least reflection light and addressing light.

Examples of the material that can be employed as the polymer matrix 11 include water soluble polymer materials (e.g., gelatin, polyvinyl alcohol, cellulose derivatives, polyacrylic acid polymers, ethylene imine, polyethylene oxide, polyacrylamide, polystyrene sulfonate salt, polyamidine, and isoprene sulfonic acid polymers), materials that can be made into an aqueous emulsion (e.g., fluorine resins, silicone resins, acrylic resins, urethane resins, epoxy resins), and the like.

Note that, in addition to the respective functional layers of the above-described display medium 1, the polymer matrix 11 may be provided with a coloring layer that optically separates the display image and external light that is incident from the non-display surface side of the display medium at the time of image writing/display, for the purpose of preventing deterioration in image quality. Further, the polymer matrix 11 may be provided with a laminate layer that is provided for the purposes of absorbing of the unevenness and achieving adhesion at the time of adhering the respective functional layers together.

(Equivalent Circuit of Display Medium)

Figure 2:
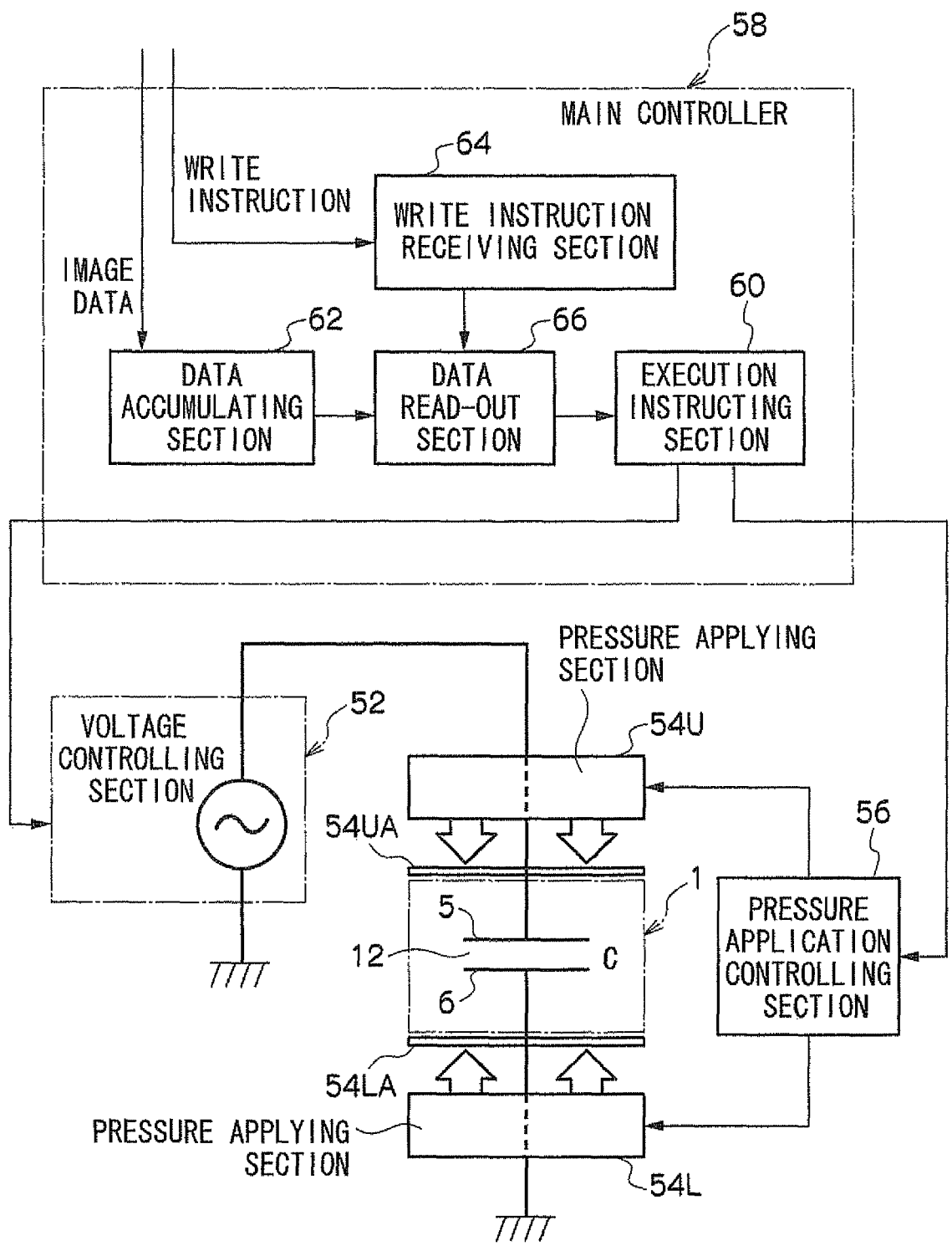
FIG. 2 is a control block diagram for image writing/display.

As shown in FIG. 2, the display medium 1 of FIG. 1 is equivalent to a capacitor C. FIG. 2 is a schematic diagram of an electrode wire switching function for selectively applying voltage to the capacitor C.

In FIG. 2, the upper electrode of the capacitor C corresponds to the transparent electrode 5 of FIG. 1, and the lower electrode of the capacitor C corresponds to the electrode 6 of FIG. 1.

The transparent electrode 5 is connected to a voltage controlling section 52. On the other hand, the electrode 6 is grounded. The voltage controlling section 52 applies a voltage (alternating voltage) that corresponds to image data, between the transparent electrode 5 and the electrode 6. Although description will be given later, this voltage V is a voltage ($V_{pf} < V < V_{fh}$) for making the orientation of the cholesteric liquid crystals 12 be in the F phase state after it has been uniformly made to be the P phase state due to application of pressure.

Pressure applying sections 54U, 54L oppose the upper and lower end surface sides of the display medium 1. The pressure applying sections 54U, 54L are connected to a pressure application controlling section 56. When there is an instruction from the pressure application controlling section 56 to the pressure applying sections 54U, 54L to apply pressure, pressure applying plates 54UA, 54LA of the pressure applying sections 54U, 54L are moved in directions of approaching one another (refer to the wide arrows in FIG. 2), and apply a predetermined pressure to the display medium 1. This application of pressure is carried out in order to make the oriented state of the cholesteric liquid crystals 12 be the P phase state uniformly (initialization processing).

Note that, in FIG. 2, the structure is such that pressure is applied simultaneously to predetermined surface areas by pressure applying plates 54UA, 54LA. However, for example, a structure may be used in which the display medium 1 is passed through between a pair of rollers such that pressure is successively applied in a linear form.

Figure 5A:
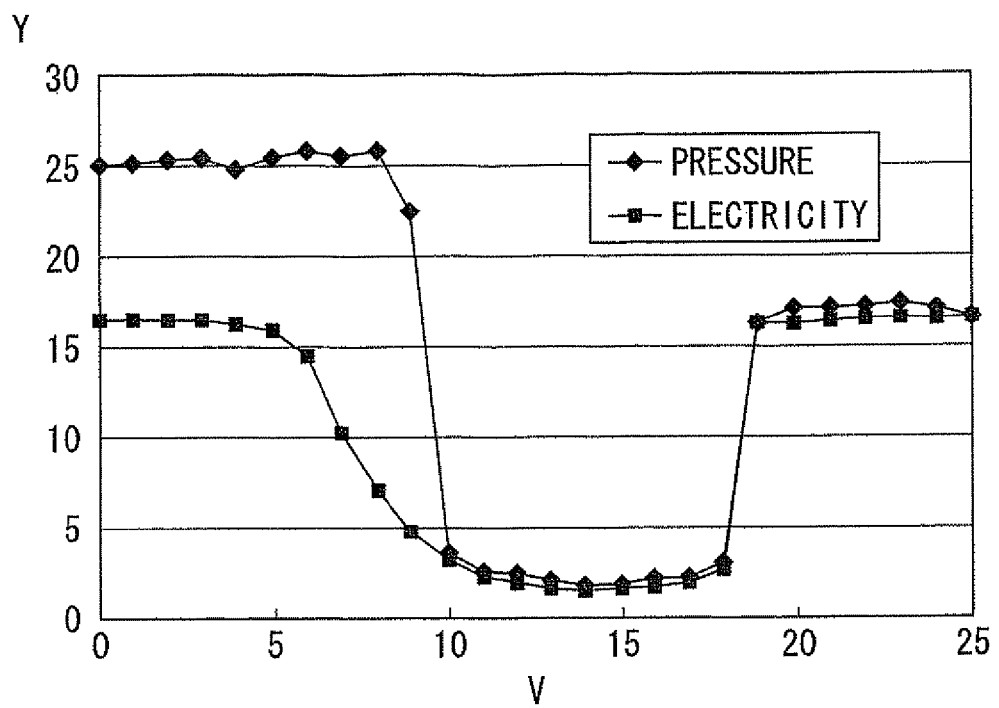
FIG. 5A is a graph showing the driving voltage—brightness characteristics in a case in which the thickness of the cholesteric liquid crystals is 2 μm.
Figure 5B:
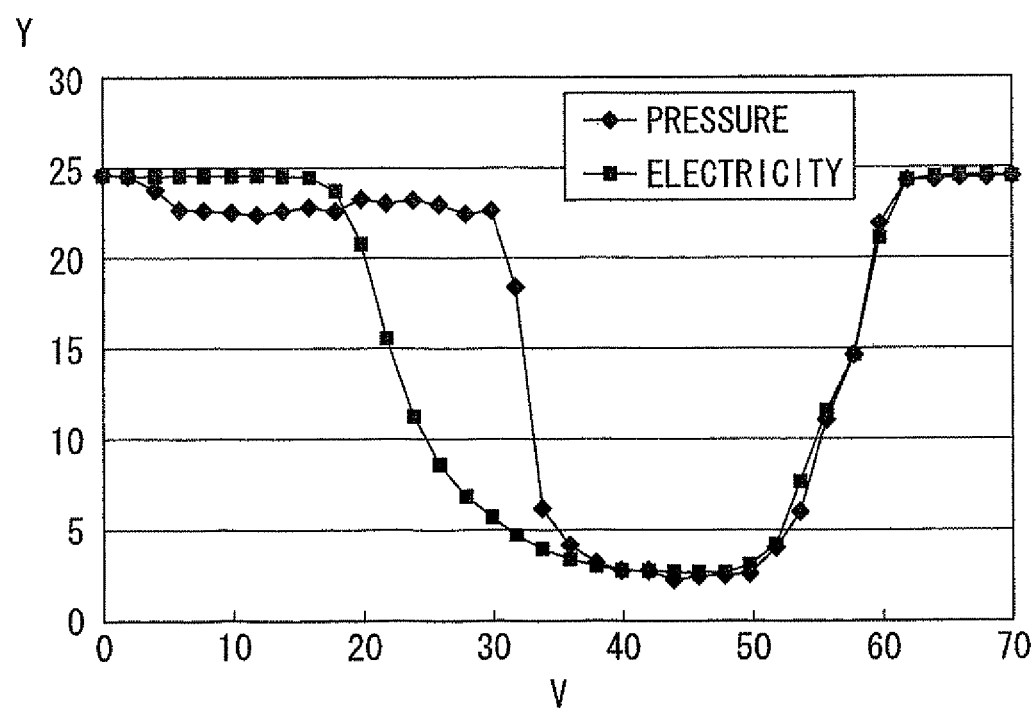
FIG. 5B is a graph showing the driving voltage—brightness characteristics in a case in which the thickness of the cholesteric liquid crystals is 10 μm.

FIG. 5A and FIG. 5B illustrate the driving voltage—brightness (luminance) characteristics at the time of carrying out writing by applying driving voltage, after the cholesteric liquid crystals are initialized by pressure (the characteristic curve connecting the plotted diamonds) and after the cholesteric liquid crystals are initialized by application of voltage (the characteristic curve connecting the plotted squares).

As shown in FIG. 5B, when the thickness of the cholesteric liquid crystals 12 is 10 μm, a brightness of 25 can be obtained at about 20 V to 30 V. However, as shown in FIG. 5A, it can be understood that, when the thickness of the cholesteric liquid crystals 12 is 2 μm, the brightness (25) cannot be obtained at the same voltage. Note that, in the case in which the thickness of the cholesteric liquid crystals 12 is 10 μm, voltage of greater than or equal to 65 V is needed in order to obtain a brightness of 25 by application of voltage alone.

In the present exemplary embodiment, a structure that uses both pressure and voltage is utilized. The specifications are such that the thickness of the cholesteric liquid crystals 12 is 2 μm and the applied driving voltage is 15 V.

As shown in FIG. 2, the voltage controlling section 52 and the pressure application controlling section 56 are connected to an execution instructing section 60 of a main controller 58.

Writing instructing information and image data are inputted to the main controller 58. The main controller 58 has a data accumulating section 62, and the inputted image data is accumulated therein.

Further, the main controller 58 has a write instruction receiving section 64, and receives the writing instructing information. The write instruction receiving section 64 is connected to a data read-out section 66. When a start-up instruction is received from the write instruction receiving section 64, the data read-out section 66 reads-out the image data from the data accumulating section 62 and sends the image data to the execution instructing section 60.

Due thereto, the execution instructing section 60 controls the voltage controlling section 52 and the pressure application controlling section 56, and executes image writing/display control.

In the present exemplary embodiment, when image writing instructing information is received, first, due to the pressure application controlling section 56 being controlled, the pressure applying plates 54UA, 54LA of the pressure applying sections 54U, 54L are operated, and pressure is simultaneously applied to the entire region of the display medium 1 (initialization processing). Due to this initialization processing, the orientation of the cholesteric liquid crystals 12 uniformly becomes the P phase state. After this initialization processing, the voltage controlling section 52 is controlled, and voltage corresponding to image data is applied between the transparent electrode 5 and the electrode 6 (writing processing).

(Orientation Characteristic of Cholesteric Liquid Crystals 12)

Next, the cholesteric liquid crystals (chiral nematic liquid crystals) 12 will be described concretely. The planar phase that the cholesteric liquid crystals 12 exhibit causes a selective reflection phenomenon in which the light that is incident in parallel on the helical axis is divided into right rotating light and left rotating light, the circularly-polarized component that coincides with the direction of twisting of the helix is Bragg reflected, and the remaining light is transmitted through. Given that the helical pitch is p, the average refractive index within the plane that is orthogonal to the helical axis is n, and the birefringence is Δn, a center wavelength λ of the reflection light and a reflection wavelength width Δλ are expressed as $\lambda = n \cdot p$, $\Delta\lambda = \Delta n \cdot p$, respectively. The light reflected by the cholesteric liquid crystal layer in the planar phase exhibits a vivid color that is dependent on the helical pitch.

Figure 3A:
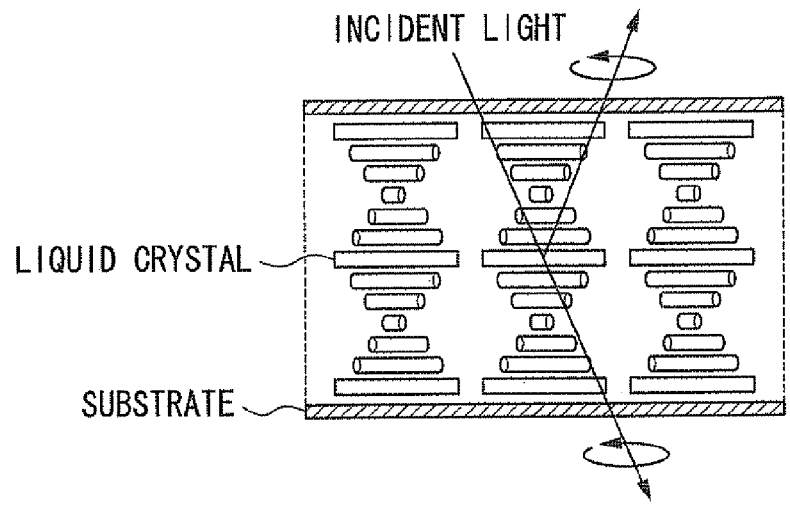
FIG. 3A is a schematic explanatory diagram showing the relationship between the orientation of molecules of cholesteric liquid crystals and the optical characteristic, in the planar phase.
Figure 3B:
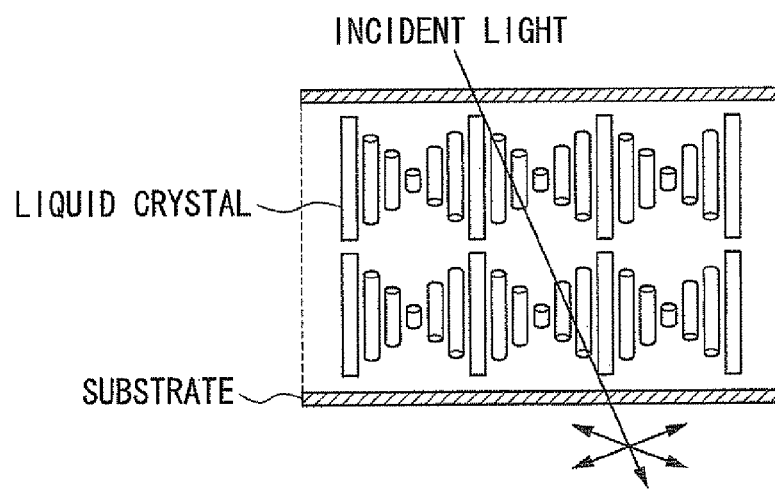
FIG. 3B is a schematic explanatory diagram showing the relationship between the orientation of molecules of cholesteric liquid crystals and the optical characteristic, in the focal conic phase.
Figure 3C:
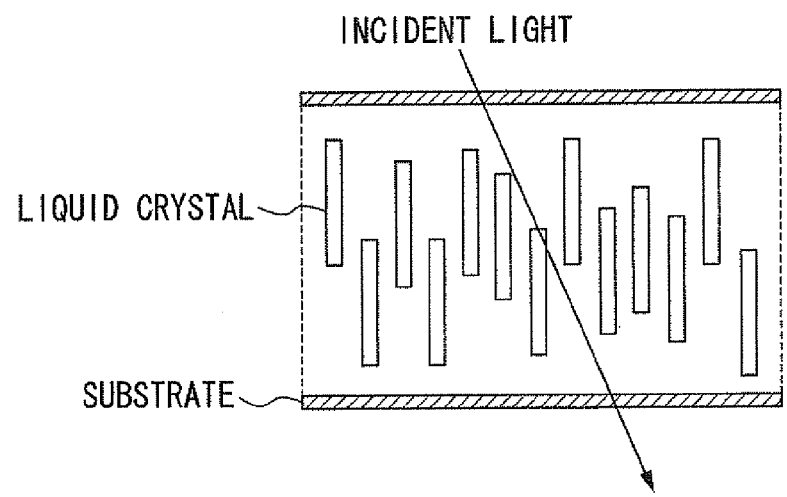
FIG. 3C is a schematic explanatory diagram showing the relationship between the orientation of molecules of cholesteric liquid crystals and the optical characteristic, in the homeotropic phase.

Cholesteric liquid crystals having positive dielectric anisotropy exhibit the following three states: as shown in FIG. 3A, a planar phase (P phase) in which the helical axis is perpendicular to the cell surface, and which brings about the above-described selective reflection phenomenon with respect to the incident light; as shown in FIG. 3B, a focal conic phase (F phase) in which the helical axis is substantially parallel to the cell surface, and in which the incident light is transmitted while being scattered forward slightly; and, as shown in FIG. 3C, a homeotropic phase (H phase) in which the helical structure is unraveled and the liquid crystal director is oriented in the electric field direction, and which transmits the incident light substantially completely.

Among the above-described three states, the planar phase and the focal conic phase can exist bistably under no electric field. Accordingly, the phase state of the cholesteric liquid crystals is not determined unconditionally with respect to the electric field strength that is applied to the liquid crystal layer. In a case in which the planar phase is the initial state, as the electric field strength increases, the phase state changes in the order of the planar phase, the focal conic phase, the homeotropic phase. In a case in which the focal conic phase is the initial state, as the electric field strength increases, the phase state changes in the order of the focal conic phase, the homeotropic phase.

On the other hand, in a case in which the electric field strength that is applied to the liquid crystal layer is suddenly made to be zero, the planar phase and the focal conic phase maintain their states as is, whereas the homeotropic phase changes to the planar phase.

Figure 4:
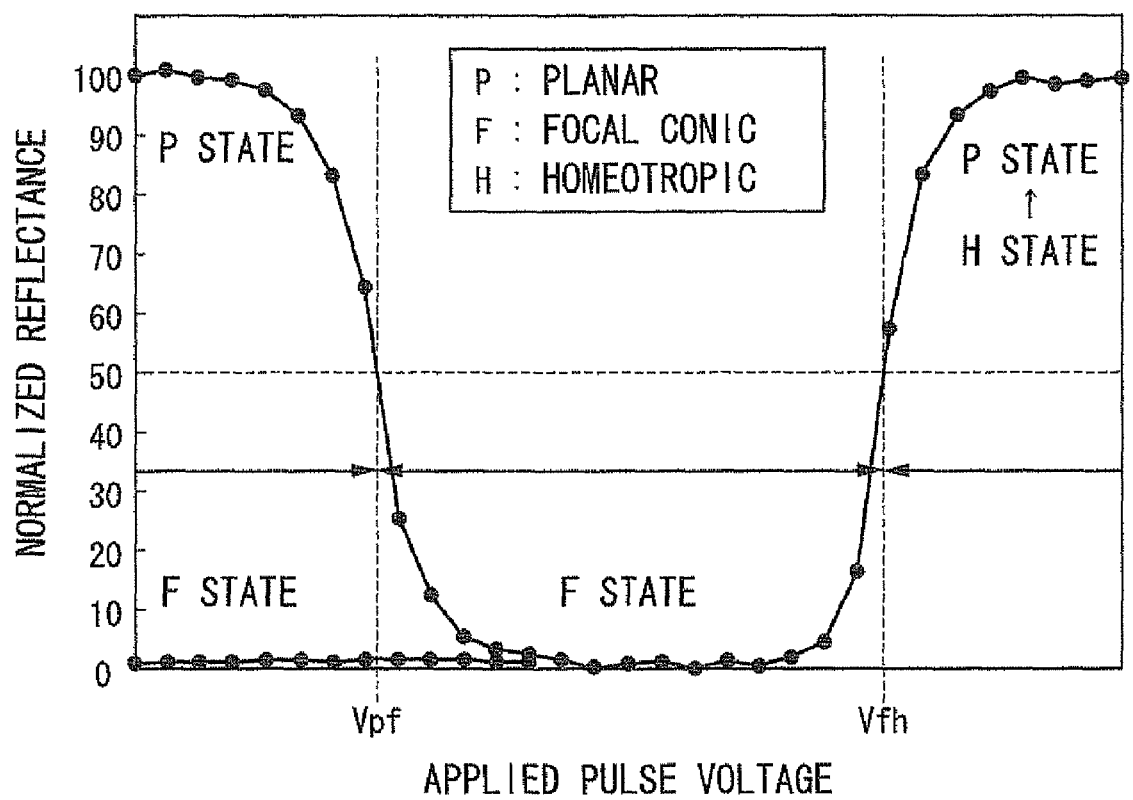
FIG. 4 is a graph for explaining the switching behavior of the cholesteric liquid crystals.

Accordingly, the cholesteric liquid crystal layer immediately after a pulse signal is applied exhibits the switching behavior shown in FIG. 4. Namely, when the voltage of the applied pulse signal is greater than or equal to Vfh, there is a selective reflection state in which the phase changes from the homeotropic phase to the planar phase. When the voltage of the applied pulse signal is between Vpf and Vfh, the state is a transmitting state in accordance with the focal conic phase. When the voltage of the applied pulse signal is less than or equal to Vpf, the state that was before application of the pulse signal continues, i.e., there is a selective reflection state in accordance with the planar phase or there is a transmitting state in accordance with the focal conic phase.

Note that, in FIG. 4, normalized reflectance is shown on the vertical axis. The reflectance is normalized with the maximum reflectance being 100 and the minimum reflectance being 0. Further, because transition regions exist between the respective states of the planar phase, the focal conic phase and the homeotropic phase, a case in which the normalized reflectance is greater than or equal to 50 is defined as a selective reflection state, and a case in which the normalized reflectance is less than 50 is defined as a transmitting state. The threshold voltage of the phase change between the planar phase and the focal conic phase is Vpf, and the threshold voltage of the phase change between the focal conic phase and the homeotropic phase is Vfh.

In particular, in a liquid crystal layer having a PNLC (Polymer Network Liquid Crystal) structure containing a mesh-like resin in a continuous phase of cholesteric liquid crystals or a PDLC (Polymer Dispersed Liquid Crystal) structure (including a microencapsulated structure) in which cholesteric liquid crystals are dispersed in droplet forms in a polymer skeleton, due to the interference at the interfaces between the polymer and the cholesteric liquid crystals (the anchoring effect), the bistability of the planar phase and the focal conic phase under no electric field improves, and the state immediately after application of the pulse signal can be maintained over a long period of time.

In the display medium 1 using these cholesteric liquid crystals 12, the selective reflection state in accordance with the planar phase, and the transmitting state in accordance with the focal conic phase, are switched by using the bistability phenomenon of the cholesteric liquid crystals. Due thereto, black-and-white monochromatic display having a memory property under no electric field, or color display having a memory property under no electric field, is carried out.

At the cholesteric liquid crystals 12, in accordance with the magnitude of the externally applied voltage, in a case in which the planar phase state (P phase state) or the homeotropic phase state (H phase state) is the initial state, the phase state changes in the order of the P state, the focal conic phase state (F phase state), the H state. In a case in which the F state is the initial state, the phase state changes in the order of the F state, the H state. Further, in cases in which the final state is the P phase state and the F phase state, the P phase state and the F phase state are maintained even after the application of voltage is cancelled. In a case in which the final state is the H phase state, the phase state changes to the P phase state. Accordingly, regardless of the exposure/non-exposure, the P phase state or the F phase state is selected as the final phase state in accordance with the magnitude of the applied voltage. As shown in FIG. 4, in the P phase state, there is a light reflecting state, and, in the F phase state, there is a light transmitting state.

Operation of the present exemplary embodiment will be described hereinafter.

(Production of Display Medium 1)

In the present exemplary embodiment, the following processes are executed in fabricating the display medium 1.

(Production Process 1)

Corning 7059 glass with ITO (25×22×1.1 t) and a 10×10 electrode are patterned so as to be 100 Ω/sq manufactured by EHC Corporation. SE7511L (manufactured by Nissan Chemical Industries, Ltd., for perpendicular orientation) is diluted 10 times in ethylcellosolve, and spin coated on the ITO electrode surface.

(Production Process 2)

An orientation layer is formed on the ITO surface. Spacer particles are dispersed on the orientation layer, a sealing pattern is drawn in the form of stripes on the substrate end portion by a UV-curing resin, and two substrates are laminated together and UV-cured.

(Combined Usage of Pressure Application and Voltage Application)

It is known that the orientation characteristic of the cholesteric liquid crystals 12 not only exhibits an orientation change due to the application of voltage, but the orientation changes due to pressure as well. Between the orientation characteristic in accordance with pressure and the orientation characteristic in accordance with voltage application, there is a difference in characteristics that is due to the thickness of the cholesteric liquid crystals 12.

Figure 6:
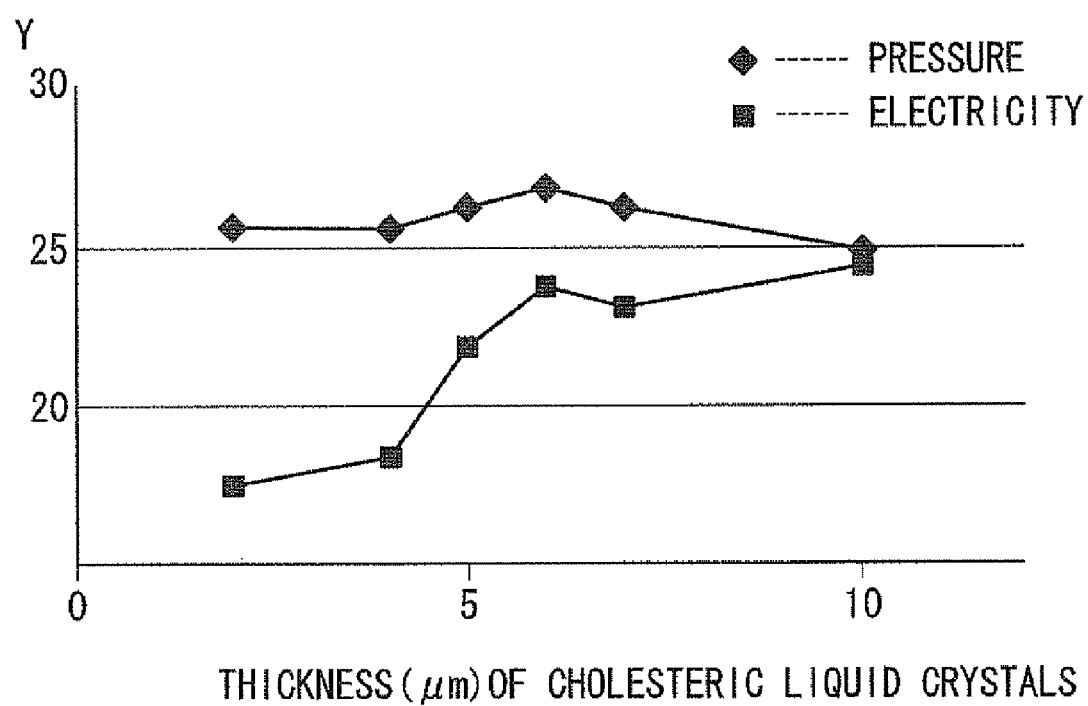
FIG. 6 is diagram showing the cholesteric liquid crystal thickness—brightness characteristics.

FIG. 6 shows the cholesteric liquid crystal 12 thickness-luminance (brightness) characteristics. The characteristic curve connecting the plotted square shapes is the voltage application (electrical) characteristic, and the characteristic curve connecting the plotted diamond shapes is the pressure application characteristic.

As shown in FIG. 6, in a case in which the thickness of the cholesteric liquid crystals 12 is 2 μm, the numerical values of the brightness are "26" for the pressure application characteristic and "18" at the voltage application characteristic, and the difference therebetween is "8". In contrast, in a case in which the thickness of the cholesteric liquid crystals 12 is 10 μm, the numerical values of the brightness are substantially the same (around "23").

From these results, it can be understood that, by also using the orientation characteristic in accordance with pressure, it is possible to avoid a change in brightness even if the thickness of the cholesteric liquid crystals 12 is made to be thin (10 μm→2 μm).

Thus, in the present exemplary embodiment, initialization processing (a uniform P phase state) is implemented by applying pressure to the cholesteric liquid crystals 12. Thereafter, by applying voltage, the orientation state of the cholesteric liquid crystals 12 can be appropriately be made to be the F phase state in accordance with the image data.

Accordingly, in the present exemplary embodiment, limitations on the thickness of the display layer can be mitigated, as compared with a case that does not have the present structure.

Further, in the present exemplary embodiment, the change in the orientation of the cholesteric liquid crystals can be controlled by pressure and voltage.

(Image Writing Processes)

An image writing control routine will be described in accordance with the flowchart of FIG. 7.

In step 100, it is judged whether or not there is a write instruction. If the judgment is negative, the routine ends.

If the judgment in step 100 is affirmative, the routine moves on to step 102 and the image data is read-out. For example, if the image data is accumulated in advance in the data accumulating section 62, the accumulated image data may be read-out. Or, if there is image data that is inputted in real time (e.g., for image data transmitted via a communication line, image data read from a document that is transmitted-in from a scanner connected to an interface, or the like), the image data may be passed through the data accumulating section 62.

In next step 104, entire surface initialization processing is carried out. Namely, the pressure application controlling section 56 is controlled, the pressure applying plates 54UA, 54LA of the pressure applying sections 54U, 54L are moved, and pressure is applied to the display medium 1. In this way, the orientation of the cholesteric liquid crystals of the display layer 7 of the display medium 1 becomes the P phase state over the entire region.

In subsequent step 106, writing processing is executed. Namely, the voltage controlling section 52 is controlled, and the orientation of regions of the cholesteric liquid crystals 12 is appropriately made to be the F phase state in accordance with the image data. In this way, writing of the image ends.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image writing/display device comprising:
    a voltage applying section that, in a state in which a display medium having a pair of electrodes and a display layer that is sandwiched between the pair of electrodes and whose reflectance is changed is positioned, applies voltage to the pair of electrodes for changing the reflectance of the display layer;
    a pressure applying section applying pressure for changing the reflectance of the display layer;
    an initialization controlling section for making the display layer a uniform reflectance by applying pressure to the display layer with the pressure applying section; and
    an image writing controlling section writing an image by applying data voltage from the voltage applying section to specific regions, that correspond to image data, of the display layer between the pair of electrodes.

2. The image writing/display device of claim 1, wherein the display layer of the display medium is cholesteric liquid crystals, and, due to pressure being applied to the cholesteric liquid crystals at initialization of the initialization controlling section, the cholesteric liquid crystals are uniformly set in a state of planar orientation, and, with the planar orientation as a base, in accordance with at least two types of applied voltage, it is determined for each region specified by the pair of electrodes whether the display layer is to be maintained in the planar orientation or is to be changed to a focal conic orientation.

3. The image writing/display device of claim 1, wherein, at the display medium, a transparent substrate, a transparent electrode, the display layer, an electrode, and a substrate are layered in that order.

4. The image writing/display device of claim 3, wherein the image writing controlling section includes a voltage controlling section that applies the data voltage between the transparent electrode and the electrode.

5. The image writing/display device of claim 1, wherein the pressure applying section includes a pair of pressure applying plates that face top and bottom end surface sides of the display medium.

6. The image writing/display device of claim 5, wherein the initialization controlling section includes a pressure application controlling section that applies a predetermined pressure between the pressure applying plates.

7. An image writing/display method comprising:
    reading-out image data for displaying an image on a display medium having a display layer whose reflectance is changed;
    executing entire-surface initialization processing that applies pressure to the display layer and makes the display layer a uniform reflectance; and
    executing writing processing that writes an image by applying data voltage to specific regions of the display layer in accordance with the image data.

* * * * *